US009548795B2

(12) United States Patent
Chu

(10) Patent No.: US 9,548,795 B2
(45) Date of Patent: Jan. 17, 2017

(54) METHOD OF IDENTIFYING WIRELESS POWER RECEIVER IN WIRELESS POWER SYSTEM

(71) Applicant: HTC Corporation, Taoyuan County (TW)

(72) Inventor: Feng-Seng Chu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 95 days.

(21) Appl. No.: 14/522,602

(22) Filed: Oct. 24, 2014

(65) Prior Publication Data

US 2015/0118962 A1 Apr. 30, 2015

Related U.S. Application Data

(60) Provisional application No. 61/895,415, filed on Oct. 25, 2013.

(51) Int. Cl.
*H04B 5/00* (2006.01)
*H04W 4/00* (2009.01)

(52) U.S. Cl.
CPC .......... *H04B 5/0031* (2013.01); *H04B 5/0037* (2013.01); *H04B 5/0056* (2013.01); *H04W 4/008* (2013.01)

(58) Field of Classification Search
CPC ... H04B 5/0031; H04B 5/0037; H04B 5/0056; H04W 4/008
USPC .......................................................... 455/41.1
See application file for complete search history.

(56) References Cited

U.S. PATENT DOCUMENTS

2003/0086423 A1* 5/2003 Hsu ..................... H04L 12/1886 370/390
2011/0043163 A1* 2/2011 Baarman ................. H02J 5/005 320/108
2013/0019269 A1* 1/2013 Hymel ............... H04N 21/4126 725/62
2013/0257364 A1 10/2013 Redding
2013/0315069 A1* 11/2013 Douglas ................ H04W 40/12 370/238
2014/0361735 A1* 12/2014 Li ........................... H02J 7/025 320/108

FOREIGN PATENT DOCUMENTS

EP 2592762 A1 5/2013
WO 2009123079 A1 10/2009

OTHER PUBLICATIONS

European Search report issued on Jan. 14, 2015 for EP application No. 14190267.6.

(Continued)

*Primary Examiner* — Wesley Kim
*Assistant Examiner* — Raj Chakraborty
(74) *Attorney, Agent, or Firm* — Winston Hsu; Scott Margo

(57) ABSTRACT

A method of identifying a wireless power receiver for a mobile device in a wireless power system includes transmitting a first identity of the mobile device to a wireless power base station of the wireless power system via a first wireless communication interface, receiving a first message including the first identity from the wireless power base station via a second wireless communication interface, and identifying the first message is destined to the mobile device according to the first identity.

11 Claims, 6 Drawing Sheets

20
220
230
200

(56) References Cited

OTHER PUBLICATIONS

Office action mailed on Feb. 5, 2015 for the European application No. 14190267.6, p. 1-7.
Alliance for wireless power, "A4WP Wireless Power Transfer System Baseline System Specification (BSS)", v1.1, Sep. 4, 2013.
Wireless power consortium, "System Description, wireless power transfer", vol. I, part I, version 1.1.2, Jun. 2013.

* cited by examiner

METHOD OF IDENTIFYING WIRELESS POWER RECEIVER IN WIRELESS POWER SYSTEM

CROSS REFERENCE TO RELATED APPLICATIONS

This application claims the benefit of U.S. Provisional Application No. 61/895,415, filed on Oct. 25, 2013 and entitled "Method and Apparatus to Identify Power Receiver in Wireless Power systems", the contents of which are incorporated herein in their entirety.

BACKGROUND OF THE INVENTION

1. Field of the Invention

The present invention relates to a method used in a wireless power system, and more particularly, to a method of identifying a wireless power receiver in a wireless power system.

2. Description of the Prior Art

With the proliferation of portable electronic devices such as mobile device (MD), smart phone and tablet PC, the demand for charging devices, especially for those provided in public areas, is increasing. In addition, people would like to get rid of annoying wires if possible. One technology which realizes this desire is wireless charging, in which portable electronic device(s) comprising a wireless power receiver is placed on and charged through a wireless power base station (e.g. a power base station comprising a wireless power transmitter).

Wireless Power Consortium (WPC) is a leading organization in the world in defining wireless charging specification. The document 'Wireless Power Transfer—Volume I, part I' in version 1.1.2 released in June 2013 describes an inter-operability interface between a wireless power transmitter (PTX) and a wireless power receiver (PRX).

Currently, the WPC is starting to define a new wireless power standard based on resonant technology, which is also known as Out-of-Band communication technology, wherein a communication interface based on the technologies with higher data rate such as Bluetooth Low Energy (BLE) and Near Field Communication (NFC) is discussed. Among the two candidates, the BLE can reach one Mbps data rate and the NFC can have four hundred Kbps data rate, which implies more applications become possible if such Out-of-Band communication technologies are adopted.

Communication interface is critical due to the need to exchange information between the wireless power transmitter and the wireless power receiver. However, since the Out-of-Band communication technology is not based on modulation of wireless power signals, a mismatch issue, or cross connection, shall be considered. Actually, such mismatch issue is already existed in another standard defined by Alliance for wireless power (A4WP), in which the communication interface between the wireless power transmitter and the wireless power receiver is based on the BLE.

Specifically, please refer to FIG. 1, which is a schematic diagram of a wireless power system 10. The wireless power system includes two wireless power base stations 120 and 140 and two mobile devices 100 and 130. The wireless power base station 120 is supplying power to the mobile device 100 while the wireless power base station 140 is supplying power to the mobile device 130 (denoted with a blank arrow). There shall be a communication interface between the wireless power base station 120 and the mobile device 100, which allows the wireless power base station 120 to get feedback information, such as the amount of power received, from the mobile device 100. However, in some cases the mobile device 100 mistakenly connects to the wireless power base station 140 instead of the wireless power base station 120 (denoted with a dashed arrow). On the other hand, the mobile device 130 which shall connect to the wireless power base station 140 now connects to the wireless power base station 120. In other words, the mobile device 100 connects to (and thus communicates with) the wireless power base station 140 which is not the wireless power base station 120 supplying power to this mobile device 100. It is indeed a mismatch and both the wireless power base stations 120 and 140 cannot identify the mobile devices 100 and 130 to which they are supplying power to get correct feedback information from the mobile devices 100 and 130. Due to the mismatch, the information sent from either the wireless power base station or the mobile device may go to wrong destination. For example, the wireless power base stations 120 and 140 may provide wrong, e.g. excess or deficient, charging power to the mobile devices 100 and 130.

Therefore, there is a need to implement identification mechanism between the mobile device and the wireless power base station to solve the abovementioned issue.

SUMMARY OF THE INVENTION

An objective of the present invention is to provide a method of identifying wireless power receiver in wireless power system.

The present invention discloses a method of identifying a wireless power receiver for a mobile device in a wireless power system includes transmitting a first identity of the mobile device to a wireless power base station of the wireless power system via a first wireless communication interface, receiving a first message including the first identity from the wireless power base station via a second wireless communication interface, and identifying the first message is destined for the mobile device according to the first identity included in the first message.

The present invention further discloses a method of identifying wireless power receiver for a wireless power base station in a wireless power system includes receiving a first identity from a mobile device of the wireless power system via a first wireless communication interface, and transmitting a first message including the first identity to the mobile device via a second wireless communication interface, such that the mobile device is able to identify that the first message is destined for the mobile device according to the first identity included in the first message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
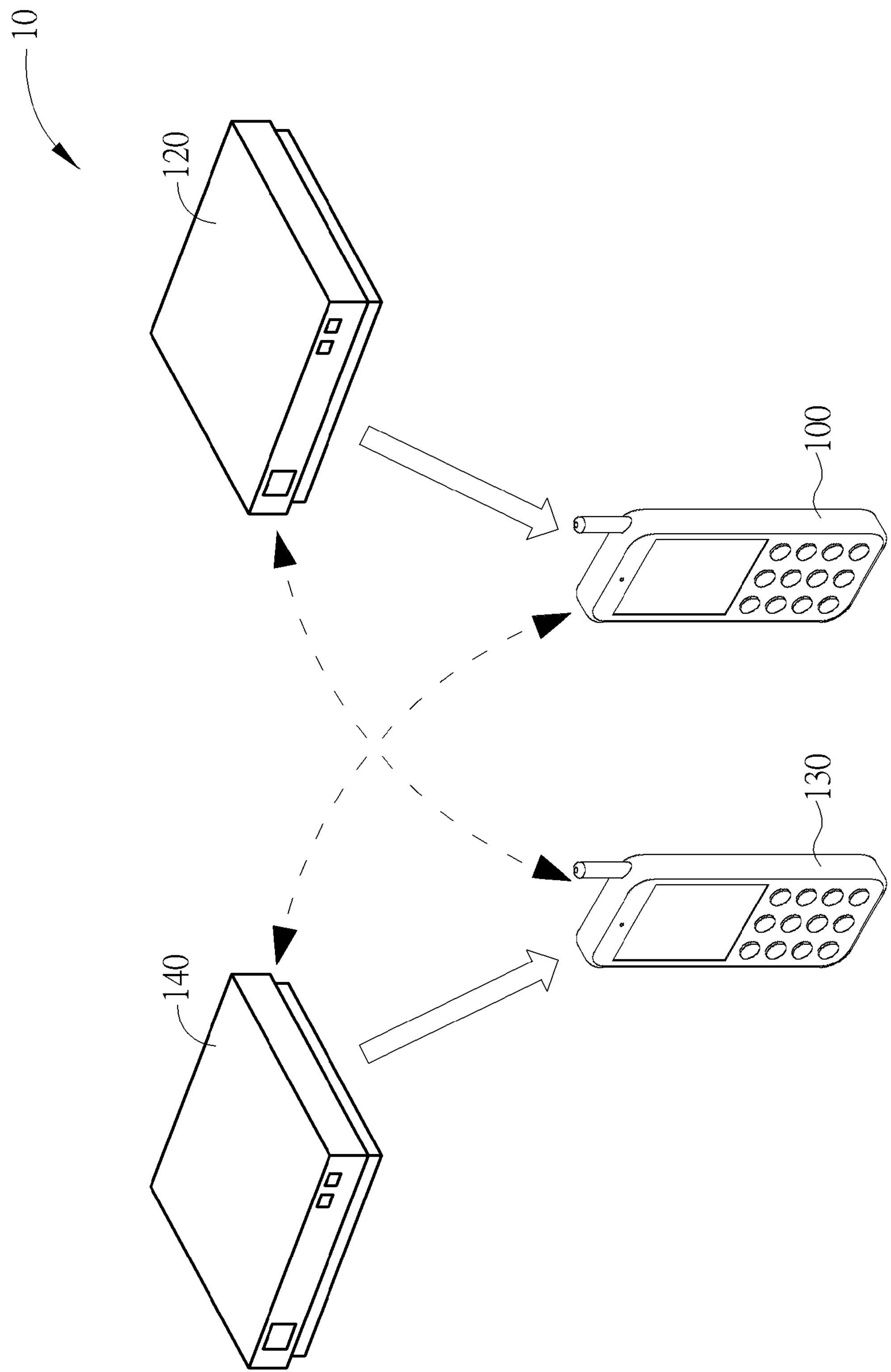
FIG. 1 is a schematic diagram of a wireless power system.
Figure 2:
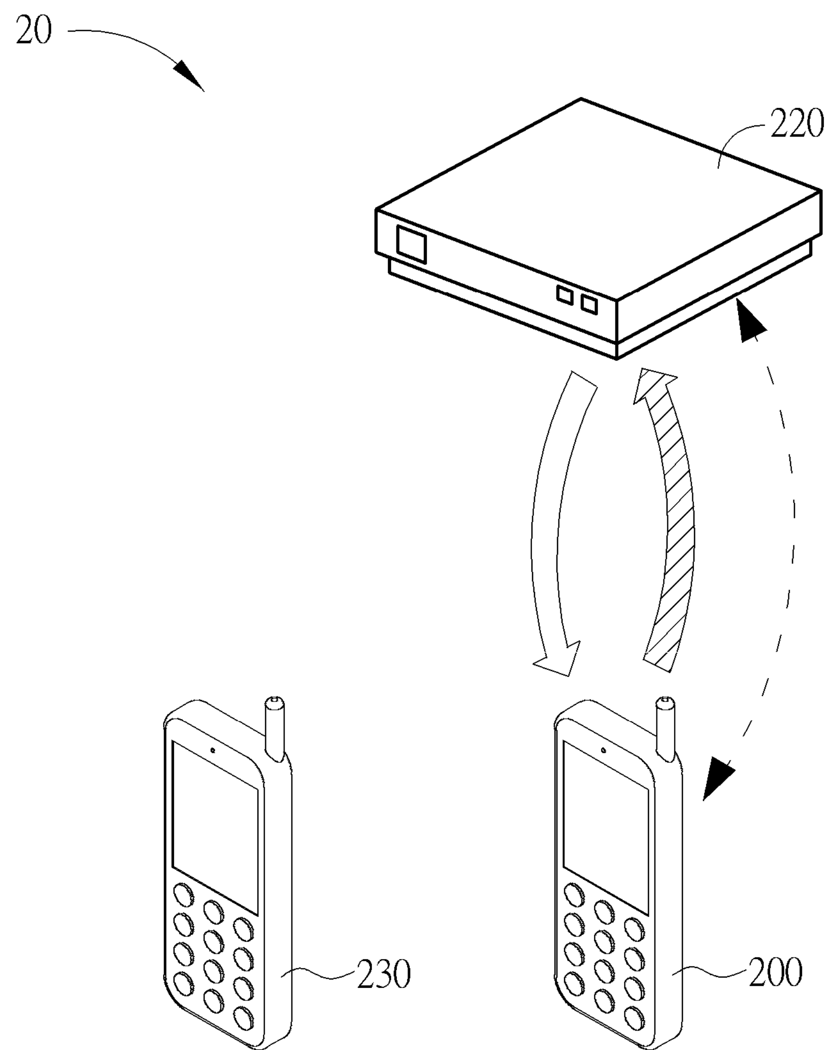
FIG. 2 illustrates a schematic diagram of a wireless power system according to an embodiment of the present invention.

Please refer to FIG. 2, which illustrates a schematic diagram of a wireless power system 20 according to an embodiment of the present invention. A wireless power system may include a plurality of mobile devices and at least one wireless power base station which is able to provide wireless power to one or more of the mobile devices. For example, in FIG. 2, the wireless power system 20 is briefly composed of a wireless power base station 220 and two mobile devices 200 and 230.

The wireless power base station 220 may include a wireless power transmitter or a wireless power transmitting module with digital/analog chip(s), to supply wireless power to the mobile devices 200 and 230. In this embodiment, the wireless power base station 220 only supplies wireless power to the mobile device 200 (denoted with a blank arrow). The mobile devices 200 and 230 may be any portable mobile device such as a mobile device (MD), a mobile phone, a laptop, a tablet computer, an electronic book, a portable computer system, or at least one wireless power receiver or wireless power receiving module. Alternatively, the mobile devices 200 and 230 may be any mobile device using battery as its power supply, such as a wearable computing device, a wearable medical device, a portable MP3 player, etc. The mobile device 200 may directly attach to the wireless power base station 220 or keep within a distance from the wireless power base station 220 for wireless charging. The mobile device 200 may receive wireless power from the wireless power base station 220 by electromagnetic induction so that the battery of the mobile device 200 is charged without using any wire connection.

In order to conquer the mismatch issue, i.e. ensure that the wireless power base station 220 is correctly connected to the mobile device 200, the mobile device 200 may utilize a first communication technology as a first communication interface to help the power transmitter of the wireless power base station 220 to identify the targeted wireless power receiver of the mobile device 200 through a second communication interface.

Specifically, as shown in FIG. 2, the wireless power receiver of the mobile device 200 may report its identity to the wireless power transmitter of the wireless power base station 220 via the first communication interface (denoted with a slashed arrow) in advance, and then the wireless power transmitter of the wireless power base station 220 may use the identity to identify the desired wireless power receiver via the second communication interface (denoted with a dashed line).

For example, the wireless power base station 220 may transit a first message including the identity and a command to the mobile devices 200 and 230 to instruct actions that the mobile device having the identity should execute. Then, the mobile device 200 may receive the first message including the identity and the command from the wireless power base station 220 via the second communication interface after the identity of itself is identified. The mobile device 230 may understand that the first message from the wireless power base station 220 via the second communication interface is not destined for it according to the identity, and react accordingly, e.g. stop receiving wireless power or not start to receive wireless power.

In one example, the mobile devices 200 may transmit a second message including the identity and feedback information in response to the first message to the wireless power base station 220 via the second communication interface, such that the wireless power base station 220 may obtain the feedback information from the mobile device 200 via the second communication interface after the identity of the mobile device 200 is identified from the second message.

Therefore, the power transmitter of the wireless power base station 220 and the wireless power receiver of the mobile device 200 may use the identity to communicate with each other via the second communication interface, which ensures that the wireless power base station 220 is correctly connected to the mobile device 200, so as to prevent the mismatch issue.

Figure 3:
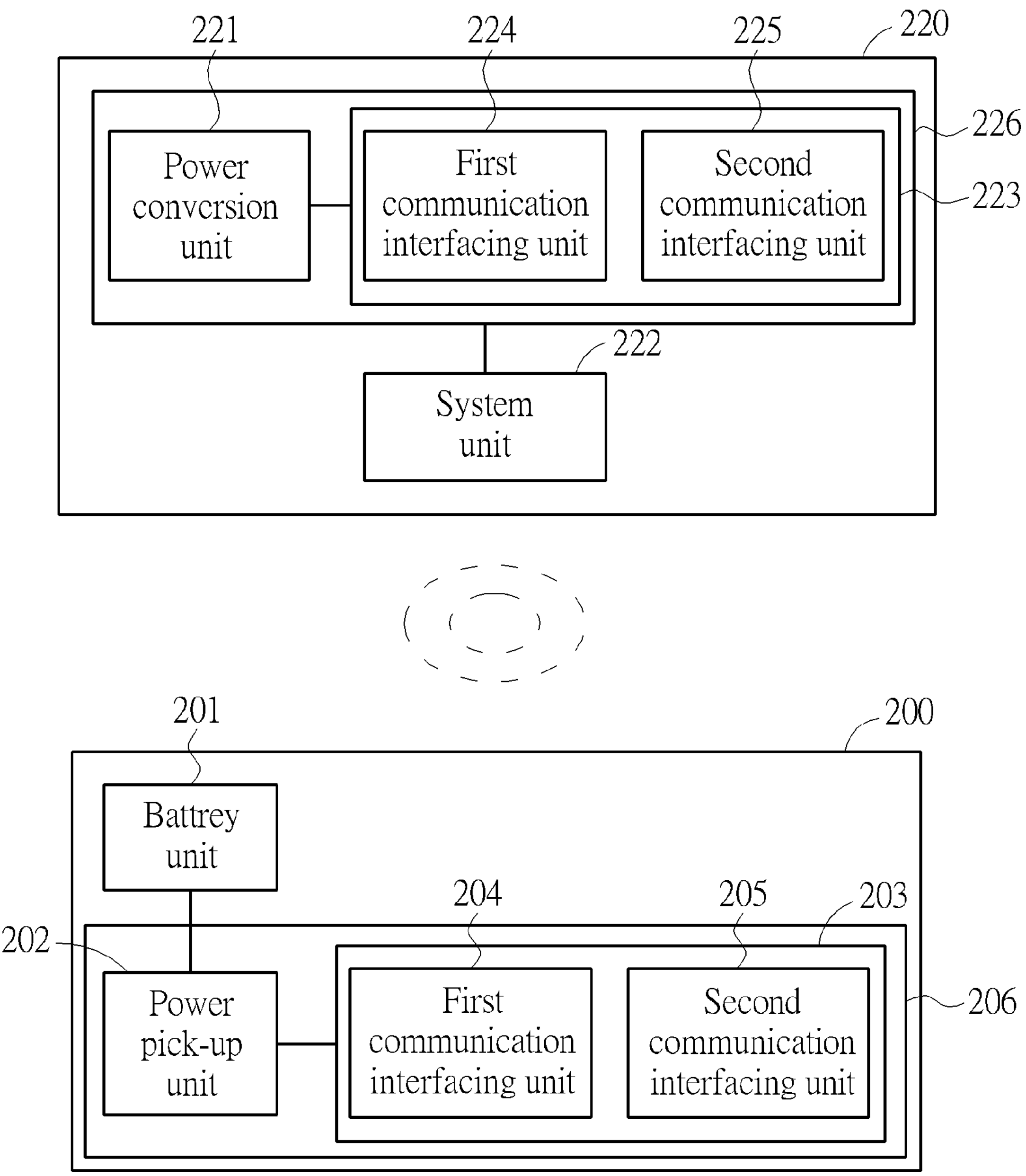
FIG. 3 is a functional block diagram of the wireless power system shown in FIG. 2 according to an embodiment of the present invention.

Please refer to FIG. 3, which is a functional block diagram of the wireless power system 20 shown in FIG. 2 according to an embodiment of the present invention. Since the mobile devices 200 and 230 may be functionally identical, there are the mobile device 200 and the wireless power base station 220 shown in FIG. 3 for simplicity. The mobile device 200 includes a battery unit 201 and a wireless power receiver 206. The wireless power receiver 206 may include a power pick-up unit 202 used for receiving wireless power to charge the battery unit 201 and a communication and control unit 203 used for communicating, i.e. sending/receiving signals or packets, with the wireless power base station 220 via the power signals and controlling the operation of the power pick-up unit 202.

The communication and control unit 203 may include first and second communication interfacing units 204 and 205. The first communication interfacing unit 204 is used for transmitting an identity or messages associated with the identity to the wireless power base station 220 by using In-Band communication channel, in which communication channels are attached on wireless power signal. Preferably, the first communication interface may be uni-directional. The communication from the mobile device 200 to the wireless power base station 220 may be carried out by using Load modulation (LM) on wireless power signal. Alternatively, the communication from the wireless power base station 220 to the mobile device 200 may be carried out by using frequency-shift keying (FSK) modulation on the wireless power signal. The second communication interfacing unit 205 is used for communicating by using Out-of-Band communication channel. Preferably, the second communication interface may be bi-directional. The communication between the mobile device 200 and the wireless power base station 220 may be implemented by radio transceivers that transmit and receive radio signals (e.g., messages, emails, or packets) in an Out-of-Band communication channel (e.g. a short-range communication protocol such as Bluetooth, Bluetooth Low Energy (BLE), Wi-Fi, Zigbee, Near Field Communication (NFC), Device-to-Device (D2D) or Machine-to-Machine (M2M) communication defined by 3rd generation partnership project (3GPP)).

The wireless power base station 220 includes a wireless power transmitter 226 and a system unit 222. The wireless power transmitter 226 may include a power conversion unit 221 used for supplying wireless power and a communication and a control unit 223 used for communicating, i.e., sending/receiving signals or packets, with the mobile device 200 and controlling the operation of the power conversion unit 221.

The communication and control unit 223 may include first and second communication interfacing units 224 and 225. The first communication interfacing unit 224 is used for communicating with the first communication interfacing unit 204 of the mobile device 200 by using In-Band communication channel. The second communication interfacing unit 225 is used for communicating with the second communication interfacing unit 205 by using Out-of-Band communication channel. In addition, the first and/or second communication interfacing units 204, 205, 224 and 225 may include definitions of bits, bytes and packets with header and payload, as long as the communication interfacing units have the same understanding to realize messages sent from each other.

The system unit 222 may include a processing means such as a microcontroller, microprocessor or an Application Specific Integrated Circuit (ASIC), for handling wireless charging authentication function activated by a processing result of the wireless power transmitter 226. In the example of FIG. 3, the wireless power base station 220 contains one wireless power transmitter 226. In other examples, the wireless power base station may contain multiple wireless power transmitters for supplying wireless power to multiple portable mobile devices.

In practice, considering the wireless power base station 220 including the wireless power transmitter 226 and the mobile device 200 including the wireless power receiver 206, and there exist two communication interfaces between the wireless power base station 220 and mobile device 200. The first communication interface is In-Band and is based on Load Modulation of wireless power signal from the wireless power transmitter 226 to the wireless power receiver 206, and the first communication interface is a uni-directional interface from mobile device 200 to wireless power base station 220. The second communication interface is Outband and is based on Bluetooth Low Energy (BLE). In this embodiment, it is assumed that there are BLE modules (i.e. the second communication interfacing units 205 and 225) in both the wireless power base station 220 and the mobile device 200, and every mobile device 200 or 230 has a unique identity which is determined by the manufacturer, and is specified in the section 6.3.8 of WPC Low Power Specification version 1.1.2. The unique identity includes Manufacture Code and Basic Device Identifier, wherein the Manufacture Code is used to identify the manufacturer of the wireless power receiver 206 while the Basic Device Identifier is used to identify the wireless power receiver 206 produced by this manufacturer.

When the mobile device 200 comes closed to the wireless power base station 220 and finds the wireless power signal, the mobile device 200 transmits a first identity of itself to the wireless power base station 220 via the communication interface based on Load Modulation. After the wireless power base station 220 receives the first identity and when the wireless power base station 220 wants to know the desired charging voltage of the mobile device 200, the wireless power base station 220 transmits a request to the mobile device 200 via the BLE, in which the first identity of the mobile device 200 is included. Then, each of the mobile devices 200 and 230 receiving the request may understand whether it is the targeted mobile device by comparing the first identity included in the request with the identity of its own.

For the mobile device 200 which finds that the first identity in the received request is the same as the identity of its own, the mobile device 200 may further transmit a second message including its desired charging voltage to the wireless power base station 220 through BLE. In the second message, the first identity of the mobile device 200 is also included such that the wireless power base station 220 can understand whether the desired charging voltage in the received second message is from the targeted mobile device 200.

Therefore, by transmitting the first identity via the Load Modulation to the wireless power transmitter 226 of the wireless power base station 220 in advance, the wireless power base station 220 and the mobile device 200 may use the first identity to communicate with each other via BLE, which ensures that the wireless power base station 220 is correctly connected to the mobile device 200, so as to prevent the mismatch issue.

Figure 4:
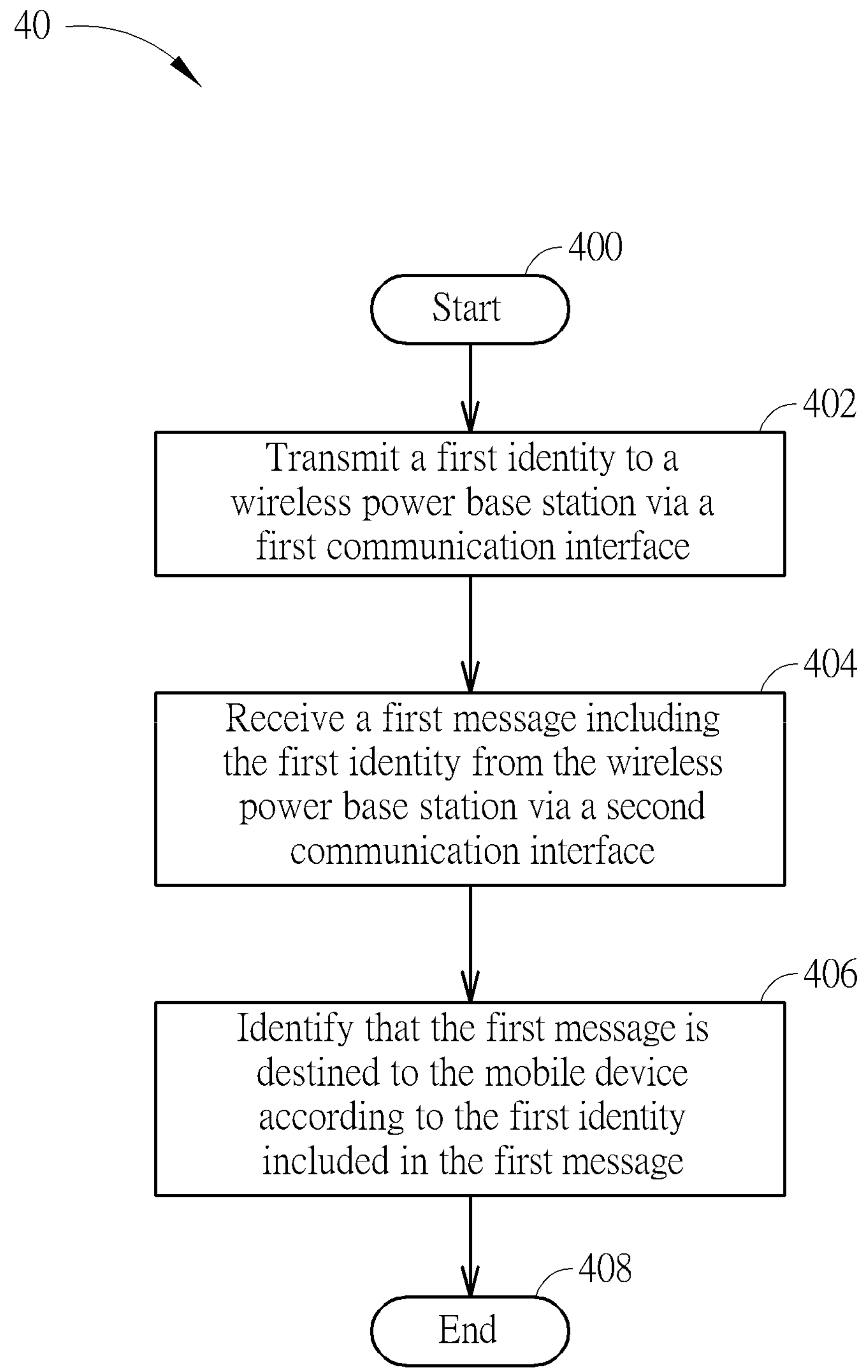
FIG. 4 is a flowchart of a process according to an embodiment of the present invention.

Please refer to FIG. 4, which is a flowchart of a process 40 according to an embodiment of the present invention. The process 40 may be utilized for a mobile device, such as the mobile device 200 or 230 shown in FIG. 2, to realize identifying wireless power receiver in the wireless power system 20. The process 40 includes the following steps:

Step 400: Start.

Step 402: Transmit a first identity to a wireless power base station via a first communication interface.

Step 404: Receive a first message including the first identity from the wireless power base station via a second communication interface.

Step 406: Identify that the first message is destined to the mobile device according to the first identity included in the first message.

Step 408: End.

According to the process 40, the mobile device 200 is configured to transmit a first identity to the wireless power base station 220 via a first communication interface. The mobile device 200 then receives a first message associated with the first identity from the wireless power base station via a second communication interface, and identify that the first message is destined for itself according to the first identity included in the first message. In other words, the mobile device 200 utilizes the first communication interface to transmit the first identity to the wireless power base station 220, such that the mobile device 200 and the wireless power base station may communicate with each other by identifying the first identity. On the other hand, if the mobile device 230 realizes that the first identity of the first message transmitted from the wireless power base station 220 via the second communication interface is not identified, the mobile device 230 may understand that the first message is not destined for the mobile device 230, and the mobile device 230 may ignore the first message, stop receiving wireless power, or not start to receive wireless power.

As a result, the process 40 may ensure that the wireless power base station 220 is correctly connected to the mobile device 200 by identifying the first identity of the mobile device 200, so as to prevent the mismatch issue.

Figure 5:
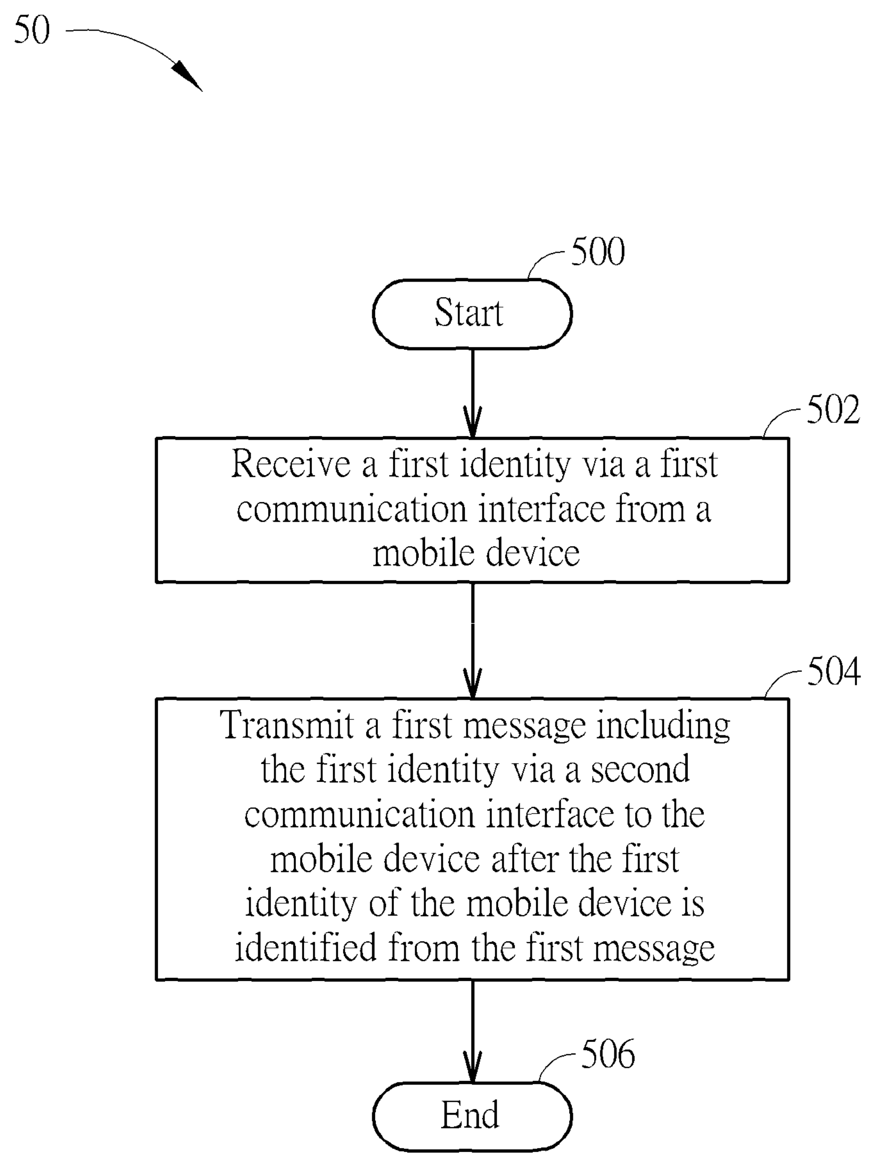
FIG. 5 is a flowchart of a process according to an embodiment of the present invention.

Please refer to FIG. 5, which is a flowchart of a process 50 according to an embodiment of the present invention. The process 50 may be utilized for the wireless power base station, such as the wireless power base station 220 shown in FIG. 2, to realize identifying a wireless power receiver in the wireless power system 20. The process 50 includes the following steps:

Step 500: Start.

Step 502: Receive a first identity via a first communication interface from a mobile device.

Step 504: Transmit a first message including the first identity via a second communication interface to the mobile device after the first identity of the mobile device is identified from the first message.

Step 506: End.

According to the process 50, the wireless power base station 220 is configured to receive a first identity from the mobile device 200 via a first communication interface. The wireless power base station 220 then transmits a first message including the first identity to the mobile device 200 via a second communication interface. In other words, the wireless power base station 220 utilizes the first communication interface to receive the first identity of the mobile device 200, such that the mobile device 200 and the wireless power base station 220 may communicate with each other by identifying the first identity. As a result, the process 50 may ensure that the wireless power base station 220 is correctly connected to the mobile device 200 by identifying the first identity of the mobile device 200, so as to prevent the mismatch issue.

Note that the processes 40 and 50 are examples of the present invention. Those skilled in the art should readily make combinations, modifications and/or alterations on the abovementioned description and embodiments. For example, the first message transmitted from the wireless power base station 220 may be commands or information (i.e. the first message) for instructing actions that the mobile device 200 should execute, such as stop receiving the wireless power. In one example, the commands or information may be authentication information that the mobile device 200 provided, such as password or personal ID. In one example, the commands or information may be parameters of the mobile device 200 or the wireless power receiver in the mobile device 200, such as desired voltage. In one example, the commands or information may be data that applications on the mobile device 200 want to send to the wireless power base station 220, such as a menu request or a location request.

Moreover, the mobile device 200 may further transmit a second message including the first identity to the wireless power base station 220 in response to the first message. For example, the mobile device 200 may transmit the second message to provide feedback or information in response to the first message. For example, the feedback or information may be an amount of power that the mobile device received. In one example, the feedback or information may be authentication information that the mobile device provided, such as password or personal ID. In one example, the feedback or information may be parameters of the mobile device or the wireless power receiver 206 in the mobile device 200, such as desired voltage. In one example, the feedback or information may be data that applications on the mobile device 200 want to send to the wireless power base station 220, such as a menu request or a location request. In one example, the mobile device 200 may receive a third message associated with a second identity, find out that the third message is not destined for the mobile device 200, and react accordingly, e.g. ignore the third message.

The first identity may be series of number, which may be denoted as a series of bits. In one example, the first identity may be a unique device identification (ID) of the wireless power receiver in the mobile device 200, which is determined by a manufacturer of the wireless power receiver in the mobile device 200, e.g. the device ID may be defined in section 6.3.8 and section 6.3.9 in WPC Low Power specification v1.1.2, which includes Manufacture Code and (Basic/Extended) Device Identifier. In one example, the first identity may be originated from other modules in the mobile device 200. One example is to use an International Mobile Subscriber Identity (IMSI) or a Radio Network Temporary Identifier (RNTI) from cellular modules. Another example is to use the NFC or BLE ID from NFC or Bluetooth modules. The identity provided from other modules may be encoded (e.g. scrambled, truncated) to become the first identity of the mobile device 200. In one example, the first identity may be dynamically configured.

The first message transmitted from the wireless power base station 220 may include both the first identity and a first series of data bits. Bits in the first identity may be placed in front of the first series of data bits. In one example, the first series of data bits may be placed in front of the bits in the first identity. Or, the bits in the first identity and the first series of data bits may be mixed.

The second message transmitted from the mobile device 200 to the wireless power base station 220 may include both the first identity and a second series of data bits. Bits in the first identity may be placed in front of the second series of data bits. In one example, the second series of data bits may be placed in front of the bits in the first identity. Or, the bits in the first identity and the second series of data bits may be mixed.

All mobile devices (including the mobile device 200) may find the first identity of the mobile device 200 from the first message by truncating, decoding or descrambling. In one example, all mobile devices (including the mobile device 200) may compare the first identity included in the first message with its identity, and understand the first series of data bits included in the first message is destined for the mobile device 200. The mobile device 230 other than the mobile device 200 received the first message may understand the first series of data bits is not destined for itself, after decoding error or other types of errors for the first message occur.

Figure 6:
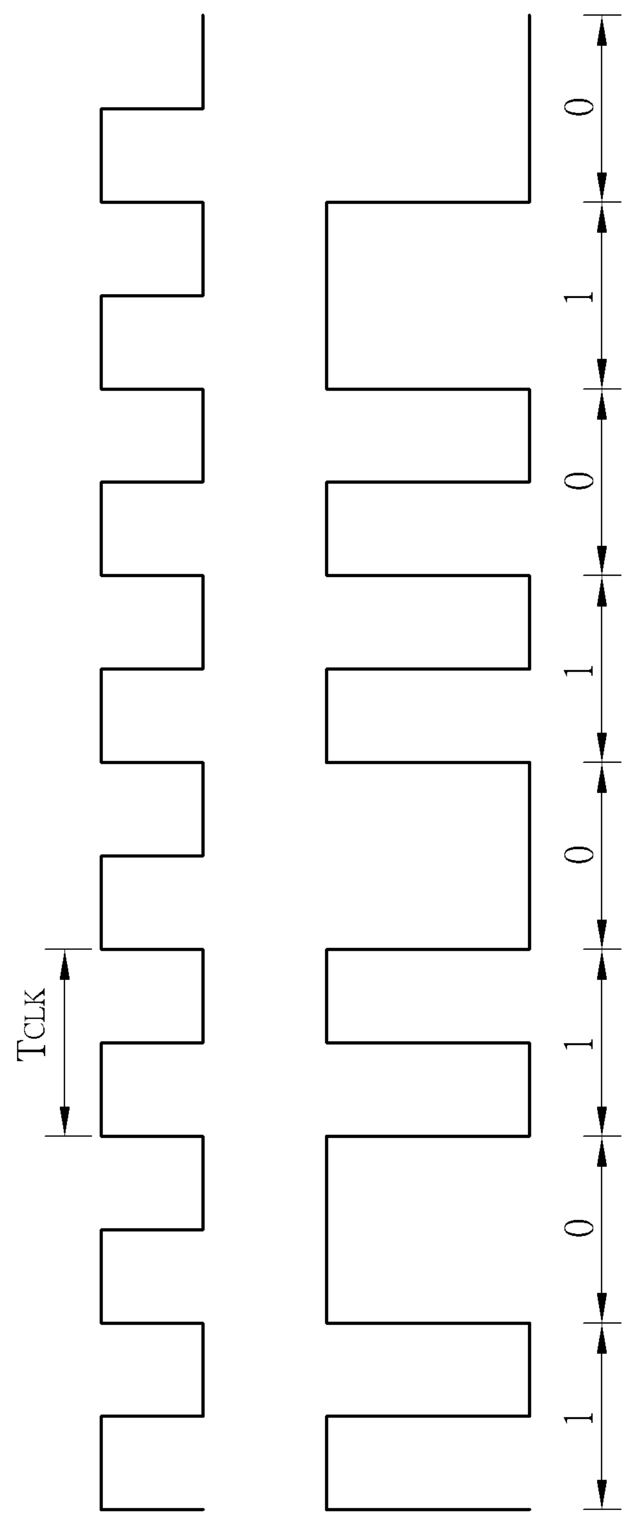
FIG. 6 illustrates a bi-phase encoding scheme of modulation of wireless power signals.

Specifically, please refer to FIG. 6, which illustrates a bi-phase encoding scheme of modulation of wireless power signals. As shown in FIG. 6, wireless power signals is differentially encoded with a clock rate of $f_{CLK}$=2 KHz, wherein a period is $T_{CLK}$. One bit is denoted by two transitions and thus the data rate is just one Kbps. Therefore, the wireless power receiver and the power transmitter may detect the transitions of the wireless power signals to decode the identity of the mobile device.

The abovementioned steps of the processes 40 and 50 including suggested steps may be realized by means of hardware, software, firmware, or an electronic system. Examples of hardware may include analog, digital and mixed circuits known as microcircuit, microchip, or silicon chip. Examples of the electronic system may include a system on chip (SOC), system in package (SiP), and a computer on module (COM).

To sum up, the present invention provides a method of identifying a wireless power receiver in a wireless power system. By transmitting the first identity of the mobile device via the first communication interface to the wireless power transmitter of the wireless power base station in advance, the wireless power base station and the mobile device may use the first identity to communicate with each other via the second communication interface, which ensures that the wireless power base station is correctly connected to the mobile device having the first identity, so as to prevent the mismatch issue.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of identifying a wireless power receiver for a mobile device in a wireless power system, comprising:

transmitting a first identity of the mobile device to a wireless power base station of the wireless power system via a first wireless communication interface;

receiving a first message including the first identity from the wireless power base station via a second wireless communication interface after the first identity is transmitted via the first wireless communication interface; and identifying the first message is destined for the mobile device according to the first identity included in the first message;

wherein the first wireless communication interface is In-Band and uni-directional wireless communication interface, and the second wireless communication interface is Out-of-Band and bi-directional wireless communication interface.

2. The method of claim 1, further comprising:

transmitting a second message including the first identity to the wireless power base station in response to the first message via the second wireless communication interface.

3. The method of claim 1, further comprising:

receiving a third message including a second identity from the wireless power base station via the second wireless communication interface; and identifying the third message is not destined for the mobile device according to the second identity included in the third message.

4. The method of claim 1, wherein the first wireless communication interface is realized by a modulation of wireless power signals of the wireless power base station, and the modulation is Frequency-Shift Keying modulation or Load modulation.

5. The method of claim 1, wherein the second wireless communication interface is realized by Bluetooth Low Energy, Near Field Communication, Zigbee, Wifi-Direct communication, Device-to-Device communication or Machine-to-Machine communication defined by third generation partnership project.

6. The method of claim 1, wherein the first identity is an identity of the wireless power receiver of the mobile device.

7. A method of identifying a wireless power receiver for a wireless power base station in a wireless power system, comprising:

receiving a first identity from a mobile device of the wireless power system via a first wireless communication interface; and transmitting a first message including the first identity to the mobile device via a second wireless communication interface after the first identity is received via the first wireless communication interface, such that the mobile device is able to identify that the first message is destined for the mobile device according to the first identity included in the first message;

wherein the first wireless communication interface is In-Band and uni-directional wireless communication interface, and the second wireless communication interface is Out-of-Band and bi-directional wireless communication interface.

8. The method of claim 7, further comprising:

receiving a second message including the first identity from the mobile device in response to the first message via the second wireless communication interface.

9. The method of claim 7, wherein the first wireless communication interface is realized by a modulation of wireless power signals of the wireless power base station, and the modulation is Frequency-Shift Keying modulation or Load modulation.

10. The method of claim 7, wherein the second wireless communication interface is realized by Bluetooth Low Energy, Near Field Communication, Zigbee, Wifi-Direct communication, Device-to-Device communication or Machine-to-Machine communication defined by third generation partnership project.

11. The method of claim 7, wherein the first identity is an identity of the wireless power receiver of the mobile device.

* * * * *